(12) United States Patent
Nakamori (10) Patent No.: US 12,533,955 B2
(45) Date of Patent: Jan. 27, 2026

(54) VEHICLE DASH PANEL AND VEHICLE DASH PANEL MOUNTING STRUCTURE

(71) Applicant: ISUZU MOTORS LIMITED, Tokyo (JP)

(72) Inventor: Tomomasa Nakamori, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 380 days.

(21) Appl. No.: 18/546,655

(22) PCT Filed: Mar. 15, 2022

(86) PCT No.: PCT/JP2022/011471
§ 371 (c)(1),
(2) Date: Aug. 16, 2023

(87) PCT Pub. No.: WO2022/196667
PCT Pub. Date: Sep. 22, 2022

(65) Prior Publication Data
US 2024/0042860 A1    Feb. 8, 2024

(30) Foreign Application Priority Data

Mar. 19, 2021    (JP) ................................. 2021-045663

(51) Int. Cl.
*B60K 37/00*    (2024.01)
(52) U.S. Cl.
CPC .................................... *B60K 37/00* (2013.01)
(58) Field of Classification Search
CPC ................................. B60K 37/00; B60K 25/14
See application file for complete search history.

(56) References Cited

U.S. PATENT DOCUMENTS

| 8,469,442 B1 * | 6/2013 | Pencak | .................. B62D 25/16 296/198 |
| 2002/0036107 A1 * | 3/2002 | Matsushita | ............ B62D 65/14 180/90 |

FOREIGN PATENT DOCUMENTS

| JP | H0546668 U | * | 6/1993 |
| JP | H08282537 A | * | 10/1996 |
| JP | H10-053097 A | | 2/1998 |
| JP | H10-129520 A | | 5/1998 |
| JP | 2019-107929 A | | 7/2019 |

(Continued)

OTHER PUBLICATIONS

Patent Cooperation Treaty, International Search Report, Application No. PCT/JP2022/011471, dated May 17, 2022, in 5 pages.

(Continued)

*Primary Examiner* — Lori Lyjak
(74) *Attorney, Agent, or Firm* — PROCOPIO, CORY, HARGREAVES & SAVITCH LLP (57) ABSTRACT

A dash panel 10 includes a dash panel body portion 17 standing in front of a vehicle compartment along a vehicle width direction, left and right intermediate portions 18 extending rearward on outer sides in the vehicle width direction from outer end edges 20 on both sides of the dash panel body portion 17 in the vehicle width direction, and left and right flange portions 15 extending toward the outer side in the vehicle width direction from outer end edges of the left and right intermediate portions 18 in the vehicle width direction.

4 Claims, 3 Drawing Sheets

(56) References Cited

FOREIGN PATENT DOCUMENTS

| KR | 20070040560 A | * | 4/2007 | ............. | B62D 25/14 |
| KR | 20140035152 A | * | 3/2014 | ............ | B62D 29/001 |

OTHER PUBLICATIONS

Patent Cooperation Treaty, WOSA, Application No. PCT/JP2022/011471, dated May 17, 2022, in 3 pages.

* cited by examiner

VEHICLE DASH PANEL AND VEHICLE DASH PANEL MOUNTING STRUCTURE

TECHNICAL FIELD

The present disclosure relates to a vehicle dash panel and a vehicle dash panel mounting structure for a vehicle.

BACKGROUND ART

Patent Literature 1 describes a front part structure for a vehicle. A plurality of brackets for supporting a front bumper, a front end panel above the front bumper, fender panels on both sides of the front end panel, and the like are provided at a vehicle front side of a dash panel, which is a partition provided at a front side of an occupant compartment of the vehicle.

CITATION LIST

Patent Literature

Patent Literature 1: JP2019-107929A

SUMMARY OF INVENTION

Technical Problem

When a pedestrian or the like collides with a front surface of the vehicle and the head of the pedestrian collides with the front end panel (front panel), there is a possibility that the pedestrian cannot be protected if the front panel is deformed rearward and is brought into contact with the bottom of the dash panel. In addition, if the dash panel is disposed at a position largely separated rearward from the front panel in order to prevent the bottom touch of the front panel against the dash panel, the vehicle compartment may become narrow.

Therefore, an object of the present disclosure is to provide a vehicle dash panel and a vehicle dash panel mounting structure for a vehicle capable of securing a wide vehicle compartment and improving pedestrian protection performance.

Solution to Problem

In order to solve the above-described problems, a first aspect of the present disclosure is a vehicle dash panel that is disposed between front end portions of left and right body side panels standing on both left and right sides of a vehicle compartment, and defines the front of the vehicle compartment. The vehicle dash panel includes left and right flange portions, a dash panel body portion, and left and right connecting portions. The left and right flange portions extend in an upper-lower direction and fixed to the front end portions of the body side panels in a state of being overlapped with each other in a front-rear direction. The dash panel body portion is disposed between the left and right flange portions, is located in front of the left and right flange portions, and is standing along a vehicle width direction in front of the vehicle compartment. The left and right connecting portions extend rearward on an outer side in the vehicle width direction from outer end edges on both sides of the dash panel body portion in the vehicle width direction and are continuous to vehicle-width-directional inner end edges of the left and right flange portions. The outer end edge on at least one side of the dash panel body portion in the vehicle width direction has a recessed region recessed toward an inner side in the vehicle width direction.

In the above configuration, the dash panel body portion that stands along the vehicle width direction in front of the vehicle compartment is positioned in front of the left and right flange portions. Therefore, unlike in a case where the dash panel body portion is disposed at a front-rear position the same as the left and right flange portions, the vehicle compartment can be secured forward widely.

Further, the dash panel body portion is positioned in front of the left and right flange portions, and the left and right connecting portions extend rearward on the outer side in the vehicle width direction from the outer end edges on both sides of the dash panel body portion in the vehicle width direction and are continuous to the vehicle-width-directional inner end edges of the left and right flange portions.

That is, the left and right connecting portions and the left and right flange portions are located rearward of the dash panel body portion, so that when a panel constituting the front surface of the vehicle (hereinafter, referred to as a "front panel") is provided in front of the dash panel, a longitudinal distance from the front panel to the left and right connecting portions and the left and right flange portions of the dash panel can be ensured to be longer than a longitudinal distance from the front panel to the dash panel body portion.

The outer end edge on at least one side of the dash panel body portion in the vehicle width direction has a recessed region recessed toward an inner side in the vehicle width direction. That is, at the height position where the recessed region is provided, the vehicle-width-directional inner end edge of the connecting portion on the one side can be disposed inward in the vehicle width direction by an amount that the outer end edge on the one side of the dash panel body portion is recessed inward in the vehicle width direction, so that the connecting portion on the one side can be secured wide on the inner side in the vehicle width direction.

As described above, the connecting portion on the one side located rearward of the dash panel body portion can be secured wide on the inner side in the vehicle width direction, so that a region with a long longitudinal distance from the front panel to the dash panel can be secured wide on the inner side in the vehicle width direction. Therefore, in the region with the long longitudinal distance from the front panel to the dash panel, when the front panel is deformed rearward, the front panel is less likely to come into contact with the bottom of the dash panel, so that by appropriately setting the height position of the above region (the height position where the recessed region of the outer end edge on the one side of the dash panel body portion is disposed), pedestrian protection performance can be improved when a pedestrian or the like collides with the front surface of the vehicle and the head of the pedestrian collides with the front panel.

The left and right connecting portions are continuous from the outer end edges on both sides of the dash panel body portion in the vehicle width direction to the vehicle-width-directional inner end edges of the left and right flange portions. That is, the left and right connecting portions are provided at outer end portions in the vehicle width direction of the dash panel, so that even if the recessed region is provided in the outer end edge on the one side of the dash panel body portion to secure a wide area of the connecting portion on the one side on the inner side in the vehicle width direction, a wide area of the vehicle compartment can be secured forward in a wide range on the inner side in the vehicle width direction than the connecting portion.

Therefore, a wide vehicle compartment can be secured and pedestrian protection performance can be improved.

A second aspect of the present disclosure is directed to the vehicle dash panel according to the first aspect, in which the recessed region of the outer end edge on the one side of the dash panel body portion is provided above an upper edge of a head lamp on the one side of the vehicle.

In the above configuration, the recessed region of the outer end edge on the one side of the dash panel body portion is provided above the upper edge of the head lamp on the one side of the vehicle. In general, the head lamp is disposed at a relatively low height position, so that the region with the long longitudinal distance from the front panel to the dash panel can be disposed at a height position (height position above the head lamp) at which the head of the pedestrian is likely to collide. Therefore, it is possible to improve the pedestrian protection performance when the head of the pedestrian collides with the front surface of the vehicle at a height position higher than the head lamp.

A third aspect of the present disclosure is a dash panel mounting structure for a vehicle, and the dash panel mounting structure for a vehicle includes left and right body side panels and a dash panel. The left and right body side panels are standing on both left and right sides of a vehicle compartment of the vehicle. The dash panel is disposed between front end portions of left and right body side panels, and defines the front of the vehicle compartment. The dash panel includes: left and right flange portions that extend in an upper-lower direction and are fixed to the front end portions of the left and right body side panels in a state of being overlapped with each other in a front-rear direction; a dash panel body portion that is disposed between the left and right flange portions, is located in front of the left and right flange portions, and is standing along a vehicle width direction in front of the vehicle compartment; and left and right connecting portions that extend rearward on an outer side in the vehicle width direction from outer end edges on both sides of the dash panel body portion in the vehicle width direction and are continuous to vehicle-width-directional inner end edges of the left and right flange portions. The outer end edge on at least one side of the dash panel body portion in the vehicle width direction has a recessed region recessed toward an inner side in the vehicle width direction.

In the above configuration, the dash panel body portion that stands along the vehicle width direction in front of the vehicle compartment is positioned in front of the left and right flange portions. Therefore, unlike in a case where the dash panel body portion is disposed at a front-rear position the same as the left and right flange portions, the vehicle compartment can be secured forward widely.

Further, the dash panel body portion is positioned in front of the left and right flange portions, and the left and right connecting portions extend rearward on the outer side in the vehicle width direction from the outer end edges on both sides of the dash panel body portion in the vehicle width direction and are continuous to the vehicle-width-directional inner end edges of the left and right flange portions.

That is, the left and right connecting portions and the left and right flange portions are located rearward of the dash panel body portion, so that when a panel constituting the front surface of the vehicle (hereinafter, referred to as a "front panel") is provided in front of the dash panel, a longitudinal distance from the front panel to the left and right connecting portions and the left and right flange portions of the dash panel can be ensured to be longer than a longitudinal distance from the front panel to the dash panel body portion.

The outer end edge on at least one side of the dash panel body portion in the vehicle width direction has a recessed region recessed toward an inner side in the vehicle width direction. That is, at the height position where the recessed region is provided, the vehicle-width-directional inner end edge of the connecting portion on the one side can be disposed inward in the vehicle width direction by an amount that the outer end edge on the one side of the dash panel body portion is recessed inward in the vehicle width direction, so that the connecting portion on the one side can be secured wide on the inner side in the vehicle width direction.

As described above, the connecting portion on the one side located rearward of the dash panel body portion can be secured wide on the inner side in the vehicle width direction, so that a region with a long longitudinal distance from the front panel to the dash panel can be secured wide on the inner side in the vehicle width direction. Therefore, in the region with the long longitudinal distance from the front panel to the dash panel, when the front panel is deformed rearward, the front panel is less likely to come into contact with the bottom of the dash panel, so that by appropriately setting the height position of the above region (the height position where the recessed region of the outer end edge on the one side of the dash panel body portion is disposed), pedestrian protection performance can be improved when a pedestrian or the like collides with the front surface of the vehicle and the head of the pedestrian collides with the front panel.

The left and right connecting portions are continuous from the outer end edges on both sides of the dash panel body portion in the vehicle width direction to the vehicle-width-directional inner end edges of the left and right flange portions. That is, the left and right connecting portions are provided at outer end portions in the vehicle width direction of the dash panel, so that even if the recessed region is provided in the outer end edge on the one side of the dash panel body portion to secure a wide area of the connecting portion on the one side on the inner side in the vehicle width direction, a wide area of the vehicle compartment can be secured forward in a wide range on the inner side in the vehicle width direction than the connecting portion.

Therefore, a wide vehicle compartment can be secured and pedestrian protection performance can be improved.

A fourth aspect of the present disclosure is directed to the dash panel mounting structure for a vehicle according to the third aspect, in which the recessed region of the outer end edge on the one side of the dash panel body portion is provided above an upper edge of a head lamp on the one side of the vehicle.

In the above configuration, the recessed region of the outer end edge on the one side of the dash panel body portion is provided above the upper edge of the head lamp on the one side of the vehicle. In general, the head lamp is disposed at a relatively low height position, so that the region with the long longitudinal distance from the front panel to the dash panel can be disposed at a height position (height position above the head lamp) at which the head of the pedestrian is likely to collide. Therefore, it is possible to improve the pedestrian protection performance when the head of the pedestrian collides with the front surface of the vehicle at a height position higher than the head lamp.

Advantageous Effects of Invention

According to the present disclosure, a wide vehicle compartment can be secured and pedestrian protection performance can be improved.

DESCRIPTION OF EMBODIMENTS

Hereinafter, an embodiment of the present disclosure will be described with reference to the drawings. In the drawings, FR indicates a front side of a vehicle, UP indicates an upper side of the vehicle, and IN indicates an inner side in a vehicle width direction. In addition, in the following description, a front-rear direction refers to a front-rear direction of the vehicle, and a left-right direction refers to a left-right direction in a state of facing the front side of the vehicle.

A dash panel 10 and a dash panel mounting structure according to the present embodiment are applied to, for example, a cab-over type vehicle 1 in which a cab 2 is disposed generally above an engine (not shown).

Figure 1:
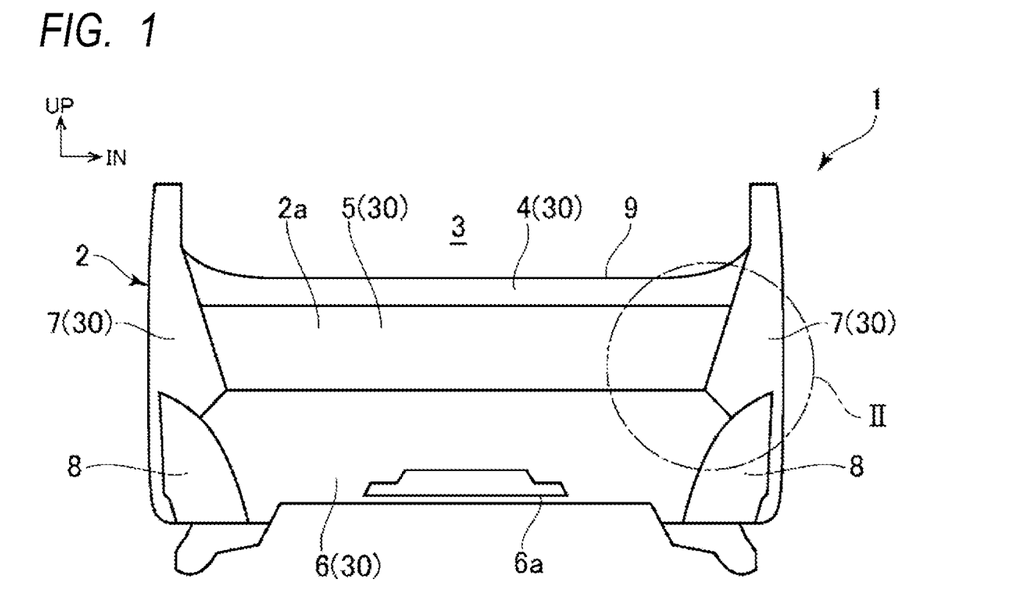
FIG. 1 is a front view of a vehicle to which a dash panel and a dash panel mounting structure according to an embodiment of the present disclosure are applied.
Figure 2:
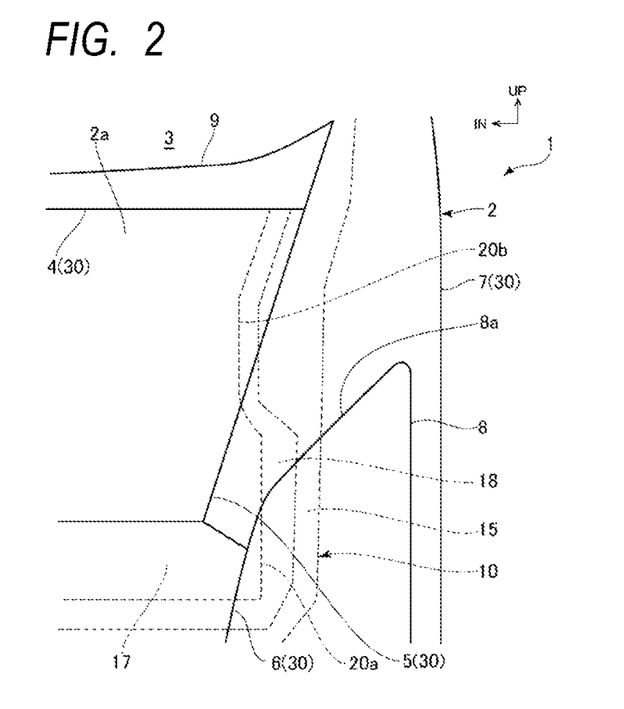
FIG. 2 is an enlarged view of a portion II in FIG. 1.

As shown in FIGS. 1 and 2, the cab 2 is formed in a box shape, is disposed in a front portion of the vehicle 1, and defines a vehicle compartment 3 therein. A front surface 2a of the cab 2 is provided with an upper panel 4, a lower panel 5, a grille panel 6, a pair of left and right front side panels 7, and left and right head lamps 8. The upper panel 4, the lower panel 5, the grille panel 6, the left and right front side panels 7, and the left and right head lamps 8 are fixed to the dash panel 10 (see FIG. 3) that partitions the front of the vehicle compartment 3.

The upper panel 4 is disposed below a front window opening 9 of the cab 2 and extends longitudinally in the vehicle width direction in front of an upper end portion of the dash panel 10. The lower panel 5 is formed in a plate shape intersecting the front-rear direction, and is disposed at a position below the upper panel 4 and separated forward from the dash panel 10.

The grille panel 6 includes a grille portion 6a, is formed in a plate shape intersecting the front-rear direction, and is disposed at a position below the lower panel 5 and separated forward from the dash panel 10. The left and right front side panels 7 are disposed at corner portions on both sides in the vehicle width direction of a front end of the cab 2.

The left and right front side panels 7 are disposed on both sides of the upper panel 4, the lower panel 5, and the grille panel 6 in the vehicle width direction. Partial regions (regions shown in FIGS. 1 and 2) of the left and right front side panels 7, the upper panel 4, the lower panel 5, and the grille panel 6 are panels constituting the front surface 2a (see FIG. 1) of the cab 2 (hereinafter referred to as a "front panel 30"). Note that the left and right front side panels 7 also include a region (not shown) that extends rearward from the partial region described above and forms an outer side surface of the cab 2 in the vehicle width direction.

The left and right head lamps 8 are disposed below the front surface 2a of the cab 2 on both sides in the vehicle width direction (for example, height positions below the height of 1.0 m from the ground). In the present embodiment, the left and right head lamps 8 are disposed below the left and right front side panels 7 and on both sides of the grille panel 6 in the vehicle width direction.

Figure 3:
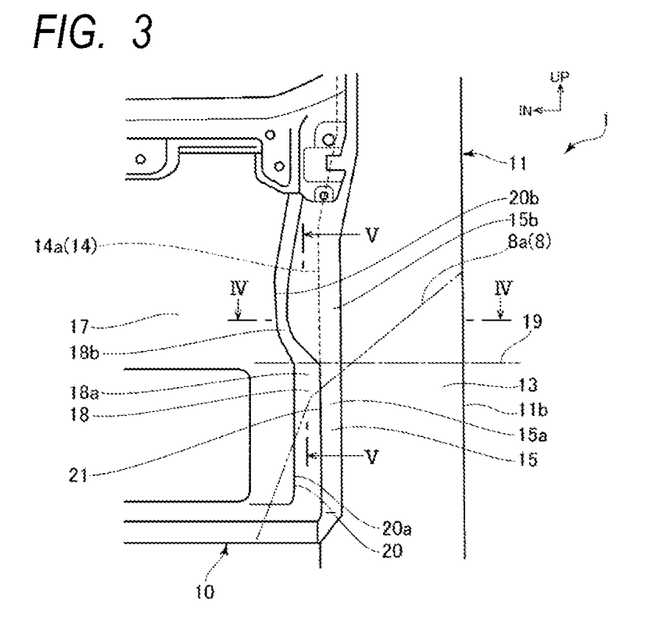
FIG. 3 is a front view showing a state in which a front panel or the like of FIG. 2 is removed.
Figure 4:
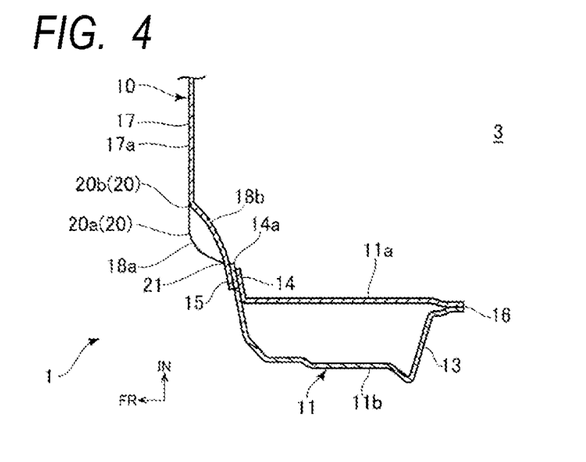
FIG. 4 is a cross-sectional view taken along a line IV-IV of FIG. 3.
Figure 5:
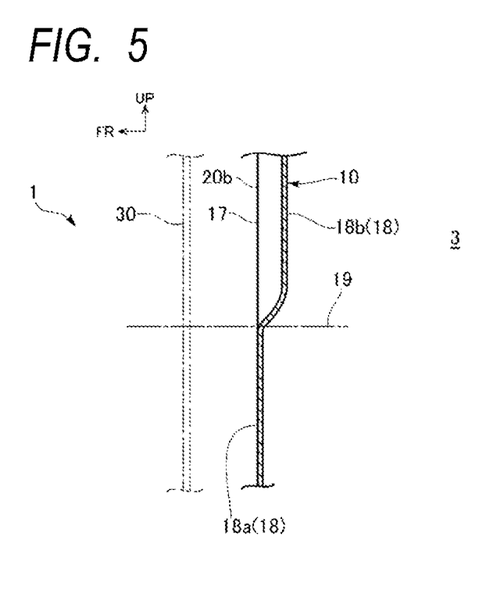
FIG. 5 is a cross-sectional view taken along a line V-V of FIG. 3.

As shown in FIGS. 3 to 5, the cab 2 includes the dash panel 10 that stands in front of the vehicle compartment 3, and left and right body side panels 11 (FIGS. 3 and 5 show the left body side panel 11) that stand on both sides of the vehicle compartment 3 in the vehicle width direction. In the present embodiment, the left and right body side panels 11 are symmetrically provided on the left and right sides of the cab 2, and have substantially the same configuration. Therefore, the left body side panel will be described and the description of the right body side panel will be omitted in the following.

The body side panel 11 has an inner panel 11a on the inner side in the vehicle width direction and an outer panel 11b on an outer side in the vehicle width direction, and is formed by joining an outer peripheral edge of the inner panel 11a and an outer peripheral edge of the outer panel 11b. The body side panel 11 is provided with a door opening 16 (see FIG. 4) that allows the vehicle compartment 3 to open toward the outer side in the vehicle width direction. The body side panel 11 has a closed cross sectional portion 13 that extends in the upper-lower direction in front of the door opening 16 and partitions the front of the door opening 16.

The closed cross sectional portion 13 is formed in a closed cross-sectional shape by the inner panel 11a and the outer panel 11b, and extends in the upper-lower direction on a front end side of the cab 2. A body side flange portion 14 formed in a plate shape that intersects the front-rear direction and extending in the upper-lower direction is provided at a vehicle width direction inner end portion on a front end side of the closed cross sectional portion 13.

The body side flange portion 14 is formed by the inner panel 11a and the outer panel 11b that overlap each other in the front-rear direction, and protrudes toward the inner side in the vehicle width direction from a front end portion of the closed cross sectional portion 13 of the body side panel 11. A flange portion 15, which will be described later, of the dash panel 10 is fixed to the body side flange portion 14 in an overlapping state from the front.

The dash panel 10 is formed in a plate shape intersecting the front-rear direction, stands along a front end edge portion of a floor panel (not shown) of the cab 2, and partitions the front of the vehicle compartment 3. The dash panel 10 includes a dash panel body portion 17, left and right intermediate portions (left and right connecting portions) 18 extending rearward on the outer sides in the vehicle width direction from outer end edges 20 on both sides of the dash panel body portion 17 in the vehicle width direction, and the left and right flange portions 15 extending toward the outer side in the vehicle width direction from outer end edges of the left and right intermediate portions 18 in the vehicle width direction.

The dash panel body portion 17, the left and right intermediate portions 18, and the left and right flange portions 15 are integrally molded. In the present embodiment, the left and right intermediate portions 18 and the left and right flange portions 15 are symmetrically provided on the left and right sides of the dash panel body portion 17, and have substantially the same configuration. Therefore, the left intermediate portion and the left flange portion will be described, and the description of the right intermediate portion and the right flange portion will be omitted in the following.

The dash panel body portion 17 is a portion that constitutes substantially the entire region of the dash panel 10 except outer end portions on both sides in the vehicle width direction of the dash panel 10, and stands along the vehicle width direction in front of the vehicle compartment 3. The dash panel body portion 17 is formed in a substantially rectangular shape elongated in the vehicle width direction with respect to the upper-lower direction, and is disposed in front of the body side flange portions 14 of the left and right body side panels 11.

The outer end edges 20 on both sides of the dash panel body portion 17 in the vehicle width direction are respectively disposed at outer end portions in the vehicle width direction of the cab 2, and extend in the upper-lower direction on the inner side in the vehicle width direction with respect to the body side flange portions 14 of the left and right body side panels 11. The outer end edges 20 on both sides of the dash panel body portion 17 in the vehicle width direction each have a linear region 20a extending downward from a predetermined height position 19 (indicated by a chain line 19 in FIGS. 3 and 5) and a recessed region 20b extending upward from the predetermined height position 19 (upper end of the linear region 20a). The linear region 20a of the outer end edge 20 extends downward (downward along a substantially vertical direction in the present embodiment) substantially linearly from the predetermined height position 19 (see FIG. 3).

The recessed regions 20b of the outer end edges 20 on both sides of the dash panel body portion 17 in the vehicle width direction are recessed so as to bulge toward the inner side in the vehicle width direction from the predetermined height position 19, and extend upward (see FIG. 3). That is, the recessed region 20b of the outer end edge 20 is located on the inner side in the vehicle width direction with respect to the lower linear region 20a. In the present embodiment, the predetermined height position 19 is set to a height position in the vicinity of the top of an upper end 8a of the head lamp 8. Therefore, the recessed region 20b is disposed at a height position in the vicinity of the top of the upper end 8a of the head lamp 8.

The intermediate portions 18 extend rearward on the outer sides in the vehicle width direction from the outer end edges 20 of the dash panel body portion 17 in the vehicle width direction, and are continues to vehicle-width-directional inner end edges 21 of the flange portions 15. The intermediate portion 18 is located rearward of a front surface 17a of the dash panel body portion 17.

A region 18b of the intermediate portion 18 extending upward from the predetermined height position 19 is formed in a shape curved so as to bulge rearward than a virtual straight line connecting the recessed region 20b of the outer end edge 20 of the dash panel body portion 17 and the vehicle-width-directional inner end edge 21 of the flange portion in a cross section intersecting with the upper-lower direction (see FIG. 4). That is, region 18b of the intermediate portion 18 extending upward from the predetermined height position 19 is recessed rearward at a front-rear position between the dash panel body portion 17 and the flange portion 15.

The region 18b of the intermediate portion 18 extending upward from the predetermined height position 19 is disposed at a height position in the vicinity of the top pf the upper end 8a of the head lamp 8. In the present embodiment, a region 18a of the intermediate portion 18 extending downward from the predetermined height position 19 is formed in a shape curved so as to bulge forward than a virtual straight line connecting the linear region 20a of the outer end edge 20 of the dash panel body portion 17 and the vehicle-width-directional inner end edge 21 of the flange portion 15 in the cross section intersecting with the upper-lower direction (see FIG. 4).

Further, in the present embodiment, a width of the intermediate portion 18 (a length in the vehicle width direction) is wider inward in the vehicle width direction in the region 18b extending upward from the predetermined height position 19 (the region extending continuously from the recessed region 20b of the outer end edge 20 of the dash panel body portion 17 to the outer side in the vehicle width direction) than in the region 18a extending downward from the predetermined height position 19 (the region extending continuously from the linear region 20a of the outer end edge 20 of the dash panel body portion 17 to the outer side in the vehicle width direction).

The flange portion 15 is a region fixed in a state in which the flange portion 15 overlaps the body side flange portion 14 of the body side panel 11 (in the present embodiment, a state of overlapping from the front side), and extends outward in the vehicle width direction from an outer end edge in the vehicle width direction of the intermediate portion 18. The flange portions 15 are formed in a plate shape intersecting the front-rear direction, and extend long in the upper-lower direction on outer end sides of both sides in the vehicle width direction of the dash panel 10. That is, the vehicle-width-directional inner end edge 21 of the flange portion 15 extends in the upper-lower direction along the vehicle-width-directional inner end edge 14a (see FIG. 3) of the body side flange portion 14.

A region 15b of the flange portion 15 extending upward from the predetermined height position 19 smoothly extends outward in the vehicle width direction from the outer end edge in the vehicle width direction of the intermediate portion 18. That is, on the inner side in the vehicle width direction of the region 15b of the flange portion 15 extending upward from the predetermined height position 19, the intermediate portion 18 extends continuously inward in the vehicle width direction from the vehicle-width-directional inner end edge 21 of the flange portion 15. In the present embodiment, a region 15a of the flange portion 15 extending downward from the predetermined height position 19 is bent from the outer end edge in the vehicle width direction of the intermediate portion 18 and extends outward in the vehicle width direction.

In the above configuration, the dash panel body portion 17 that stands along the vehicle width direction in front of the vehicle compartment 3 is positioned in front of the left and right flange portions 15. Therefore, unlike in a case where the dash panel body portion 17 is disposed at a front-rear position the same as the left and right flange portions 15, the vehicle compartment 3 can be secured forward widely.

Further, the left and right intermediate portions 18 and the left and right flange portions 15 are located rearward of the dash panel body portion 17. Therefore, a longitudinal distance from the front panel 30 constituting the front surface 2a of the cab 2 to the left and right intermediate portions 18 and the left and right flange portions 15 of the dash panel 10 can be ensured to be longer than a longitudinal distance from the front panel 30 to the dash panel body portion 17.

Further, the outer end edges 20 on both sides of the dash panel body portion 17 in the vehicle width direction each have the recessed region 20b recessed inward in the vehicle width direction in a front view above the predetermined height position 19. Therefore, at the height position where the recessed region 20b is provided, the vehicle-width-directional inner end edge of the intermediate portion 18 can be disposed inward in the vehicle width direction by an amount that the outer end edge 20 of the dash panel body portion 17 is recessed inward in the vehicle width direction, and the intermediate portion 18 (region 18b) can be secured wide on the inner side in the vehicle width direction.

As described above, the intermediate portion 18 located rearward of the dash panel body portion 17 can be secured wide on the inner side in the vehicle width direction, so that a region with a long longitudinal distance from the front panel 30 to the dash panel 10 can be secured wide on the inner side in the vehicle width direction. Therefore, in the region with the long longitudinal distance from the front panel 30 to the dash panel 10, when the front panel 30 is deformed rearward at the time of a collision of the vehicle 1 or the like, the front panel 30 is less likely to come into contact with the bottom of the dash panel 10, so that by appropriately setting the height position of the above region (the height position where the recessed region 20b of the outer end edge 20 of the dash panel body portion 17 is disposed), pedestrian protection performance can be improved when a pedestrian or the like collides with the front surface 2a of the vehicle 1 and the head of the pedestrian collides with the front panel 30.

Further, the intermediate portion 18 is continuous from the outer end edge 20 of the dash panel body portion 17 in the vehicle width direction to the vehicle-width-directional inner end edge 21 of the flange portion 15. That is, the intermediate portion 18 is provided at an outer end portion in the vehicle width direction of the dash panel 10, so that even if the recessed region 20b is provided in the outer end edge 20 of the dash panel body portion 17 to secure a wide area of the intermediate portion 18 on the inner side in the vehicle width direction, a wide area of the vehicle compartment 3 can be secured forward in a wide range (the dash panel body portion 17) on the inner side in the vehicle width direction than the intermediate portion 18.

Further, the recessed regions 20b of the outer end edges 20 on both sides of the dash panel body portion 17 in the vehicle width direction are disposed at a height position in the vicinity of the top of the upper end 8a of the head lamp 8. In general, the head lamp 8 is disposed at a relatively low height position (in the present embodiment, a height position below the height of 1.0 m from the ground), so that the region with the long longitudinal distance from the front panel 30 to the dash panel 10 can be disposed at a height position (higher than 1.0 m from the ground) at which the head of the pedestrian is likely to collide. Therefore, it is possible to improve the pedestrian protection performance when the head of the pedestrian collides with the front surface 2a of the vehicle 1 at a height position higher than the head lamp 8.

Thus, according to the present embodiment, the wide vehicle compartment 3 can be secured and the pedestrian protection performance can be improved.

In the present embodiment, the recessed regions 20b are provided in the outer end edges 20 on both sides of the dash panel body portion 17 in the vehicle width direction. Alternatively, the recessed region 20b may be provided in any one of the outer end edges 20 of the dash panel body portion 17 in the vehicle width direction. In this case, the left and right intermediate portions 18 may be left-right asymmetrical.

Further, in the present embodiment, the recessed region 20b of the outer end edge 20 of the dash panel body portion 17 is disposed at the height position in the vicinity of the top of the upper end 8a of the head lamp 8. Alternatively, the recessed region 20b may be disposed at a height position spaced upward from the upper end 8a of the head lamp 8. Alternatively, in a case of a vehicle in which the head lamp 8 is disposed at a high position, the recessed region 20b of the outer end edge 20 of the dash panel body portion 17 may be disposed at a height position lower than the head lamp 8.

Further, in the present embodiment, the front panel 30 includes the upper panel 4, the lower panel 5, the grille panel 6, and the partial region (the regions shown in FIGS. 1 and 2) of left and right front side panels 7, but the front panel 30 is not limited thereto, and may have other configurations as long as the front panel 30 stands up in front of the dash panel 10 and constitutes the front surface 2a of the cab 2.

Although the present disclosure has been described based on the above embodiment, the present disclosure is not limited to the contents of the above embodiment, and can be appropriately changed without departing from the present disclosure. That is, other embodiments, examples, operation techniques, or the like made by those skilled in the art based on this embodiment are all included in the scope of the present invention.

The present application is based on Japanese Patent Application No. 2021-045663 filed on Mar. 19, 2021, and contents thereof are incorporated herein as reference.

INDUSTRIAL APPLICABILITY

The dash panel and the dash panel mounting structure according to the present disclosure can be widely applied to various vehicles.

REFERENCE SIGNS LIST 1 vehicle
3 vehicle compartment
8 head lamp
10 dash panel
11 left and right body side panels
15 left and right flange portions
17 dash panel body portion
18 left and right intermediate portions (left and right connecting portions)
20 outer end edges on both sides of the dash panel body portion in vehicle width direction
20b recessed regions of outer end edges on both sides of the dash panel body portion in vehicle width direction
21 vehicle-width-directional inner end edge of flange portion

The invention claimed is:

1. A vehicle dash panel that is disposed between front end portions of left and right body side panels standing on both left and right sides of a vehicle compartment, and defines the front of the vehicle compartment, the vehicle dash panel comprising:

left and right flange portions extending in an upper-lower direction and fixed to the front end portions of the left and right body side panels in a state of being overlapped with each other in a front-rear direction;

a dash panel body portion disposed between the left and right flange portions, located in front of the left and right flange portions, and standing along a vehicle width direction in front of the vehicle compartment; and left and right connecting portions extending rearward on an outer side in the vehicle width direction from outer end edges on both sides of the dash panel body portion in the vehicle width direction and continuing to vehicle-width-directional inner end edges of the left and right flange portions, wherein the outer end edge on at least one side of the dash panel body portion in the vehicle width direction has a recessed region recessed toward an inner side in the vehicle width direction.

2. The vehicle dash panel according to claim 1, wherein the recessed region of the outer end edge on the one side of the dash panel body portion is provided above an upper edge of a head lamp on the one side of the vehicle.

3. A dash panel mounting structure for a vehicle comprising:
left and right body side panels standing on both left and right sides of a vehicle compartment of the vehicle; and
a dash panel to be disposed between front end portions of the left and right body side panels and defining the front of the vehicle compartment, the dash panel including left and right flange portions that extend in an upper-lower direction and are fixed to the front end portions of the left and right body side panels in a state of being overlapped with each other in a front-rear direction, a dash panel body portion that is disposed between the left and right flange portions, is located in front of the left and right flange portions, and is standing along a vehicle width direction in front of the vehicle compartment, and left and right connecting portions that extend rearward on an outer side in the vehicle width direction from outer end edges on both sides of the dash panel body portion in the vehicle width direction and are continuous to vehicle-width-directional inner end edges of the left and right flange portions, wherein the outer end edge on at least one side of the dash panel body portion in the vehicle width direction has a recessed region recessed toward an inner side in the vehicle width direction.

4. The dash panel mounting structure for a vehicle according to claim 3,
wherein the recessed region of the outer end edge on the one side of the dash panel body portion is provided above an upper edge of a head lamp on the one side of the vehicle.

* * * * *